United States Patent
Amacker et al.

(10) Patent No.: US 8,365,081 B1
(45) Date of Patent: Jan. 29, 2013

(54) EMBEDDING METADATA WITHIN CONTENT

(75) Inventors: Matthew W. Amacker, San Jose, CA (US); Russell A. Dicker, Seattle, WA (US); Ryan J. Snodgrass, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 375 days.

(21) Appl. No.: 12/473,479

(22) Filed: May 28, 2009

(51) Int. Cl.
*G06F 3/00* (2006.01)

(52) U.S. Cl. ....... 715/748; 709/204; 709/238; 705/27.1; 705/27.2

(58) Field of Classification Search .................... 715/748
See application file for complete search history.

(56) References Cited

U.S. PATENT DOCUMENTS

| | | | |
|---|---|---|---|
| 6,657,702 B1 * | 12/2003 | Chui et al. | 355/40 |
| 6,901,378 B1 * | 5/2005 | Linker et al. | 705/26.41 |
| 6,912,530 B1 * | 6/2005 | Hanson et al. | 1/1 |
| 7,447,712 B2 * | 11/2008 | Beizer et al. | 1/1 |
| 7,526,650 B1 * | 4/2009 | Wimmer | 713/176 |
| 7,599,580 B2 * | 10/2009 | King et al. | 382/306 |
| 7,680,703 B1 * | 3/2010 | Smith | 705/26.8 |
| 7,720,723 B2 * | 5/2010 | Dicker et al. | 705/26.8 |
| 7,756,892 B2 * | 7/2010 | Levy | 707/781 |
| 7,788,134 B1 * | 8/2010 | Manber et al. | 705/26.1 |
| 7,797,352 B1 * | 9/2010 | Hopwood et al. | 707/804 |
| 7,853,564 B2 * | 12/2010 | Mierau et al. | 707/638 |
| 2002/0059325 A1 * | 5/2002 | Beizer et al. | 707/203 |
| 2002/0065844 A1 * | 5/2002 | Robinson et al. | 707/500 |
| 2003/0140185 A1 * | 7/2003 | Cherry et al. | 710/15 |
| 2003/0204447 A1 * | 10/2003 | Dalzell et al. | 705/26 |
| 2004/0169736 A1 * | 9/2004 | Rakvica et al. | 348/222.1 |
| 2004/0207722 A1 * | 10/2004 | Koyama et al. | 348/14.02 |
| 2005/0021624 A1 * | 1/2005 | Herf et al. | 709/204 |
| 2005/0078804 A1 * | 4/2005 | Yomoda | 379/1.02 |
| 2005/0143126 A1 * | 6/2005 | Chipchase | 455/557 |
| 2005/0183018 A1 * | 8/2005 | Shinkai et al. | 715/723 |
| 2005/0195927 A1 * | 9/2005 | Solonen | 375/346 |
| 2006/0004699 A1 * | 1/2006 | Lehikoinen et al. | 707/2 |
| 2006/0020624 A1 * | 1/2006 | Svendsen et al. | 707/103 R |
| 2007/0033259 A1 * | 2/2007 | Wies et al. | 709/206 |
| 2007/0106627 A1 * | 5/2007 | Srivastava et al. | 706/20 |
| 2007/0208875 A1 * | 9/2007 | Plewnia | 709/238 |
| 2007/0216773 A1 * | 9/2007 | Kojima et al. | 348/207.1 |
| 2007/0244924 A1 * | 10/2007 | Sadovsky et al. | 707/104.1 |
| 2008/0059570 A1 * | 3/2008 | Bill | 709/203 |
| 2008/0263137 A1 * | 10/2008 | Pattison et al. | 709/203 |
| 2009/0023472 A1 * | 1/2009 | Yoo et al. | 455/556.1 |

(Continued)

OTHER PUBLICATIONS

Trillian Astra, Trillian <http://www.trillian.im>, downloaded from wayback machine <http://web.archive.org> archived on Dec. 29, 2008.*

*Primary Examiner* — William Bashore
*Assistant Examiner* — Reza Nabi
(74) *Attorney, Agent, or Firm* — Lee & Hayes, PLLC (57) ABSTRACT

Techniques for embedding metadata into a piece of content are described herein. With use of the embedded metadata, an application takes one or more actions specified by the embedded metadata upon selection of the content. In some instances, the content comprises an image, video, or any other form of content that a user may consume. Using the example of an image, the techniques may embed metadata within the image to create an image file that includes both the image and the embedded metadata. Then, when an application of a computing device selects (e.g., receives, opens, etc.) the image file, the application or another application may perform one or more actions specified by the metadata.

16 Claims, 10 Drawing Sheets

U.S. PATENT DOCUMENTS

| | | | |
|---|---|---|---|
| 2009/0044227 A1* | 2/2009 | Nagatani et al. | 725/46 |
| 2009/0063299 A1* | 3/2009 | Amacker | 705/27 |
| 2009/0132462 A1* | 5/2009 | Szabo | 707/1 |
| 2009/0140986 A1* | 6/2009 | Karkkainen et al. | 345/173 |
| 2009/0157527 A1* | 6/2009 | Bhambri et al. | 705/26 |
| 2009/0182610 A1* | 7/2009 | Palanisamy et al. | 705/9 |
| 2010/0030578 A1* | 2/2010 | Siddique et al. | 705/3 |
| 2010/0070057 A1* | 3/2010 | Sugiyama | 700/94 |
| 2010/0121920 A1* | 5/2010 | Horner et al. | 709/204 |
| 2010/0124353 A1* | 5/2010 | Cohen | 382/100 |
| 2010/0191619 A1* | 7/2010 | Dicker et al. | 705/27 |
| 2010/0211409 A1* | 8/2010 | Kotula et al. | 705/3 |
| 2011/0004533 A1* | 1/2011 | Soto et al. | 705/27.1 |
| 2011/0059728 A1* | 3/2011 | Poisson | 455/414.1 |

* cited by examiner

EMBEDDING METADATA WITHIN CONTENT

BACKGROUND

Content providers serve over a network numerous different user interfaces (UIs) to client computing devices for consumption by users. These UIs often include an array of text, images, video and other different types of content. The served UIs may comprise news articles, social networking pages, e-commerce shopping pages or any form of UI that a user may consume. In addition, these computing-device users may consume UIs that are created at a local machine of a respective user. For instance, a user may view videos or pictures that the computing device of the user stores locally.

In each of the described instances, content such as video and images are helpful to the consuming user. For instance, if the user requests and receives a news article from a content provider, the images within the news article may help the user better understand the news that the article conveys. While these traditional forms of content are helpful and well-used, these traditional forms of content may be enhanced to provide an even richer user experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Embodiments of the present disclosure are directed to, among others, techniques for embedding metadata into a piece of content (e.g., media content) such that upon receiving or selecting the content, an application takes one or more actions specified by the embedded metadata. In some instances, the content comprises an image, video, or any other form of content that a user may consume. Using the example of an image, the techniques may embed metadata within the image to create an image file that includes both the image and the embedded metadata. Then, when an application of a computing device selects (e.g., receives, opens, etc.) the image file, the application or another application may perform one or more actions specified by the metadata These actions may include any sort of action that is external to the image and in addition to the rendering of the image. These actions may include, for instance, displaying content in addition to the image of the image file, opening up a page associated with a Uniform Resource Locator (URL) address specified by the metadata, selecting a link (embedded within the image) to an executable file or an application, executing code or script embedded within the image or any other action that is external to the image of the image file. In some instances, the format of the embedded metadata comprises a standard format that may be read by a variety of applications. As such, the image file comprising the image and the embedded metadata may comprise a file that is application independent.

In some instances, a server embeds the metadata into the content before serving the content to one or more client computing devices. For instance, the server may embed metadata into an image before serving the image as a part of a user interface (UI) for rendering on the client computing devices. In addition or in the alternative, the techniques may also allow users of the client computing devices to embed the metadata within the content, such as the images. Here, the users may use tools available either locally or remotely over a network to embed the metadata into the content.

In some instances, the users may then transport the content that includes the metadata embedded therein to a location other than the UI on which the content was originally rendered. For instance, the users may transport (e.g., via a drag-n-drop operation, a copy and paste operation, etc.) the content into a directory folder of the users' local computing devices. Here, upon opening the content files from the directories, the client computing devices may perform the action(s) specified by the metadata. Additionally or alternatively, the users may transport the content into communication applications for sending the content to one or more other users. Here, the receiving users' computing devices may perform the action(s) specified by the metadata in response to receiving and/or opening the content.

Regardless of the actor that embeds the metadata into the content, the embedded metadata may include an instruction that directs the receiving application to perform a variety of tasks upon receiving and/or opening the content. For instance, envision that a content provider embeds metadata into an image of an item offered for consumption. This metadata may specify that upon receiving or selecting the file, the receiving computing device should purchase the item, place the item into an electronic shopping cart, and/or open a page associated with the item.

In some instances, an application and/or a user may determine whether automatically perform or decline the action(s) that the embedded specifies or, conversely, whether to seek approval of the user. Furthermore, in some instances these determinations may be user-configurable. For instance, a user may provide a configuration that automatically allows the opening of a web page in response to receiving an image file that specifies such an action. Conversely, if the user's device receives an image file that includes embedded metadata instructing an application of the device to purchase a particular item, the configurations of the user may result in the application seeking approval of the user before purchasing the item.

Furthermore, some image files (or other pieces of content having metadata embedded therein) may visually indicate to the user that the image includes embedded metadata specifying execution of one or more actions. For instance, an image file may include an icon, such as a star or the like, that indicates to the user that the image includes metadata specifying performance of some action. As such, the user may be aware that the image or other piece of content may cause performance of the action(s) responsive to selection of the image (or the piece of content) by the user.

With use of this embedded metadata, the content provider may serve a UI that includes the image of the item along with the embedded metadata. A user may then transport (e.g., drag-n-drop, etc.) the image into a folder directory of the user. Then, upon selecting the image file at a later date from the folder directory, the image file may specify that a client application (e.g., a browser or the like) of the computing device initiate purchase of the item, initiate placement of the item into an electronic shopping cart of the user, or initiate the opening of a page associated with the illustrated item.

Alternatively, the user could transport (e.g., drag-n-drop, etc.) the image file with the embedded metadata into a communication application to send the file to another user. Upon receiving the file, the receiving computing device may similarly initiate acquisition of the item, place the item that the image illustrates into an electronic cart of the receiving user, or initiate the opening of the page associated with the illustrated item.

In one particular example, the sending user may transport the image from a user interface served by a content provider into a real-time communication window that maintains a real-time communication between the sending user and the receiving user. For instance, the sending user may drag-n-drop the image from a web page and into an instant messaging or chat window. Upon sending the message including the image to the receiving user, the communication application (e.g., the instant message or chat application) of the receiving device may recognize that the image has metadata embedded therein.

This application may then extract the instruction from the image file, which may instruct the application display one or more images in addition to the received image. In the example of the item offered for consumption, the receiving application may locate and display a price of the item, an availability of the item, a rating of the item or any other details of the item. In addition or in the alternative, the application may cause a client application (e.g., a browser) to open up a web page associated with the item. In some instances, the communication application of the sending user may refrain from displaying the additional images (e.g., price, availability, etc.) that are displayed in the real-time communication window of the receiving user.

In another example, envision that the content provider embeds metadata into an image of a song or video that instructs a receiving application to play a particular sample of the song or video in response to selecting the image. Here, a user may drag-n-drop the associated image (e.g., the album art or any other image) into another location (e.g., a local directory folder, a window of a communication application, etc.). Upon selection of the image file, an application may extract the instructions and may cause the playing of the specified sample. In the instant message or chat example, a sending user may send an image to a receiving user and, upon receiving the image, the computing device of the receiving user may begin playing the specified sample.

In a related example, the sending user may actually gift the song or video to the receiving user by sending the image to the receiving user. Here, the sending user may embed metadata specifying that upon receiving the image file, the computing device of the receiving user should obtain the song or video at a specified location and should charge a specified payment instrument of the first user. While this example describes a digital item, the same techniques may apply to the gifting of a physical item or money. For physical items, the sending of the image of the physical item to another user may be effective to initiate delivery to a shipping address of the receiving and charging of the transaction to a specified payment instrument of the sending user. To gift money, meanwhile, a sending user could send an image of money (e.g., a twenty dollar bill) to a receiving user. Upon receiving or selecting the image, an account of the sending user specified in the metadata may be debited twenty dollars (or another specified amount) while twenty dollars may be deposited into an account of the receiving user.

In another example, envision that a content provider that hosts a social networking site embeds information about a particular user into an image of the user. This information may comprise identifying information associated with the user, such as a name of the user, an email address of the user, or any other information that identifies the user. This metadata embedded within the image may also specify an action to be taken with use of the identifying information upon selection of this image. For instance, the metadata may specify that upon selection of the image, the computing device should initiate composition of an email to the person illustrated in the image.

Conversely or additionally, the metadata may specify that the user's device should initiate addition of the illustrated person to a "friends" list associated with the user. That is, the action may instruct a user's device to extract the identifying information associated with the illustrated person and begin addition of this person to a "friends" list of the user. Therefore, if a sending user sends this image to a receiving user, the device of the receiving user may extract the identifying information and may automatically begin the process of adding the identified person to the "friends" list on the account of the receiving user at the social networking site.

Furthermore, envision that a particular user holds an account at two distinct social networking sites. Envision also that a computing device of this user renders a UI served by a first of these social networking sites, with the UI including an image having the metadata discussed immediately above embedded therein. This user may open up a UI associated with the second social networking site and may transport (e.g., drag-n-drop, etc.) the image from first UI and into the second UI. In response, the device of the user may extract the identifying information from the image and may begin the process of adding the identified person to a "friends" list of the user at the second social networking site. Of course, while these examples describe addition of the illustrated person to a "friends" list it is to be appreciated that the metadata may specify numerous other actions.

While a few example actions have been listed, it is to be appreciated that pieces of content may be embedded with metadata that instructs many other similar or different actions. For example, envision that an image of a book cover has been embedded with metadata instructing an application to open up a sample of the book available at a particular URL (or actually provided by the embedded metadata). Here, when the application selects the image, the application may open up the sample at the specified URL. Additionally, envision that an image of a business card has been embedded with metadata instructing an application to display details of the person referenced in the business card upon selection of the image of the card. In still another example, selection of an image (e.g., an image of a coupon) may open a URL to auto-redeem a one-time use coupon (i.e., a one-time token that is embedded into the coupon image). In still other examples, an image may instruct an application to load an online gallery of photographs, may instruct an application to open up a simple message service (SMS) text message addressed to a specified user or may instruct an application to open a link to install an application (e.g. a word processing application or the like).

As discussed above, the techniques described herein thus enable an actor (e.g., a content provider, a user, an Internet Service Provider (ISP), etc.) to embed metadata into content (e.g., an image, a video, etc.) with the metadata specifying one or more actions to be taken upon receiving or opening the content. While a few non-limiting examples have been provided above, it is to be appreciated these techniques may enable many other similar or different actions.

The discussion begins with a section entitled "Illustrative Architecture," which describes a non-limiting environment in which a content provider or a user may embed metadata into a piece of content, such as an image. Next, a section entitled "Illustrative User Interfaces" follows and describes examples of user interfaces (UIs) that may be served to and rendered at the device of the user of FIG. 1. A section entitled "Additional Illustrative Architecture" then describes yet another architecture that may implement the claimed techniques. Here, a first user may send (via a communication application) an image having metadata embedded therein to a second user. A fourth section (entitled "Additional Illustrative User Interfaces") then illustrates and describes additional UIs that may be implemented with the architecture of FIG. 6. Finally, the discussion concludes with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 1:
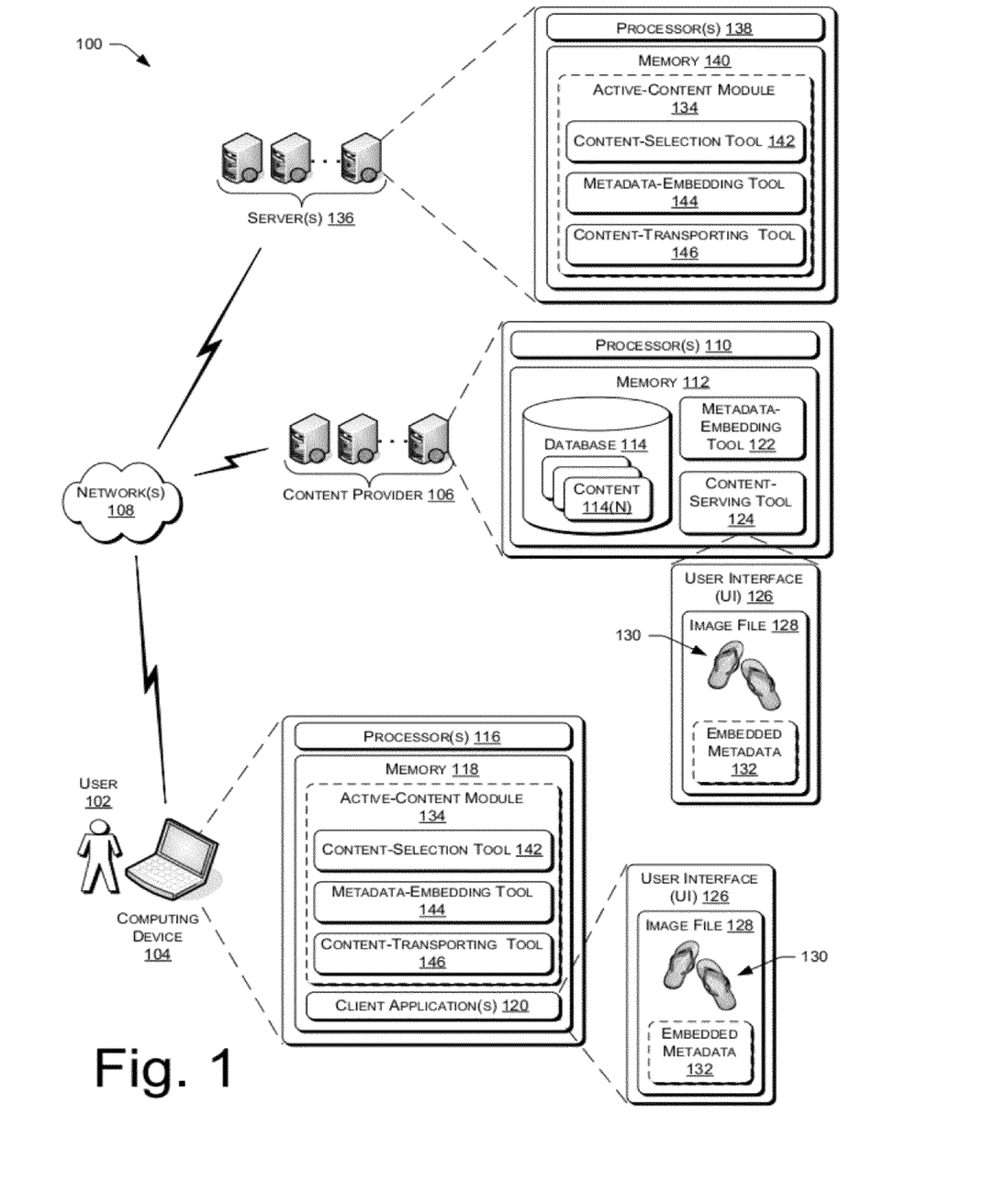
FIG. 1 illustrates an example architecture in which metadata may be embedded within pieces of content, such as images, videos, or the like. As illustrated, a content provider may embed the metadata within a piece of content before serving the content to a user and/or the user may embed metadata into the content or into another piece of content. In each instance, the embedded metadata specifies an action for a receiving application to take upon receiving or selecting the content (e.g., the image).

FIG. 1 depicts an illustrative architecture 100 in which techniques for embedding metadata within pieces of content may be implemented. In architecture 100, a user 102 utilizes a computing device 104 to access a content provider 106 via a network 108. Network 108 may include any one or combination of multiple different types of networks, such as cable networks, the Internet, and wireless networks. While the illustrated example represents user 102 accessing content provider 106 over network 108, the described techniques may equally apply in instances where user 102 interacts with content provider 106 via a kiosk or in any other manner. It is also noted that the described techniques may apply in other client/server arrangements (e.g., set-top boxes, etc.), as well as in non-client/server arrangements (e.g., locally-stored software applications, etc.).

Content provider 106 comprises one or more servers having one or more processors 110 and memory 112. These servers are capable of handling requests from many users and serving, in response, various user interfaces (UIs) that can be rendered at user computing devices, such as computing device 104. Memory 112 (as well as other memories described herein) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In some instances, content provider 106 comprises any type of local or publicly-accessible site that supports user interaction, including online retailers, informational sites, social networking sites, blog sites, search engine sites, news and entertainment sites, and so forth. As discussed above, the described techniques can be implemented within a site or otherwise.

In the illustrative architecture, content provider 106 includes a database 114 that stores or otherwise has access to one or more pieces of content 114(1), 114(2), . . . , 114(N). Pieces of content 114(1)-(N) may comprise images, videos or any other type of content that may be served as part of a UI to computing device 104 and/or to one or more other devices. While FIG. 1 illustrates device 104 as a laptop computer, other client computing devices may include desktop computers, portable digital assistants (PDAs), mobile phones, set-top boxes, game consoles, and so forth. In each instance and as illustrated, computing device 104 is equipped with one or more processors 116 and memory 118 to store client applications 120 and data, such as a browser or other client application that enables access to content provider 106.

In some instances, content provider 106 offers one or more items for consumption and, as such, pieces of content 114(1)-(N) may comprise images, videos, or other information associated with these items. An item may include anything that content provider 106 offers for purchase, rental, subscription, viewing, informative purposes or some other form of consumption. In some embodiments, the item may be offered for consumption by content provider 106, while in other embodiments, content provider 106 may host items that others are offering using the site. An item can include a product, a service, a digital download, a news clip, customer-created content (e.g., a customer review), information, or some other type of sellable or non-sellable unit.

With use of a client application, computing device 104 requests and receives UIs from content provider 106. As illustrated, content provider 106 includes a metadata-embedding tool 122 and a content-serving tool 124. Metadata-embedding tool 122 functions to embed metadata within pieces of content 114(1)-(N), while content-serving tool 124 serves UIs that include the content 114(1)-(N) with the metadata embedded therein to computing device 104. FIG. 1 illustrates that the content-serving tool 124 may create and serve a UI 126 that includes image file 128, possibly in addition to other content, such as other images, videos, text, or the like. As illustrated, the image file includes both an image 130 and embedded metadata 132. FIG. 1 also illustrates that content-serving tool 124 may serve UI 126 for rendering on computing device 104.

Metadata-embedding tool 122 may embed this metadata 132, which may instruct an application that receives, opens or otherwise selects the corresponding content to perform one or more actions. In some instances, these actions that the metadata specifies are external to and otherwise independent of the piece of content in which the metadata is embedded. For instance, the metadata may instruct a receiving application to display an image in addition to the piece of content, to cause display of a particular web page or UI, to initiate acquisition of a particular item, or take any other similar or different action, described both above and below. Furthermore, in some instances the metadata may comprise a pointer to a location (e.g., a particular Uniform Resource Locator (URL)) where the receiving application may determine the exact actions to be taken.

In addition or in the alternative to content provider 106 embedding metadata 132 within image 130, the described techniques may allow a user such as user 102 to embed metadata within pieces of content, such as images or videos. FIG. 1 illustrates that memory 118 further stores or has access to an active-content module 134, either stored locally on device 104 or available for use over network 108 on one or more servers 136 having one or more processors 138 and memory 140. When device 104 stores active-content module 134 locally, this module may comprise a plug-in to a client application (e.g., a browser plug-in), may comprise a portion of an operating system of the device, may comprise a standalone application or may be embodied via any other suitable technology. Additionally, it is noted that while FIG. 1 illustrates servers 136 as distinct and separate from content provider 106, content provider 106 may provide active-content module 134 in some instances. In each instance, active-content module 134 includes a content-selection tool 142, a metadata-embedding tool 144 and a content-transporting tool 146.

With use of active-content module 134, user 102 may embed metadata within a piece of content (e.g., content 114(1)-(N)) and may transport this content to a destination that differs from an original location of the content. To do so, content selection tool 142 enables user 102 to select a piece of content to embed metadata therein. Similar to the discussion above regarding the embedding of metadata 132 by content provider 106, user 102 may choose to embed metadata into a piece of content that forms only a portion of a UI. For instance, envision that a UI includes multiple elements, such as images, videos, and text. User 102 may choose, for instance, a particular image in which to embed metadata therein.

After making this selection, user 102 may employ metadata-embedding tool 144 to embed metadata within the selected image. Again, this metadata may include an instruction that instructs a receiving application to perform a particular action external to the image when the application receives or otherwise selects the image file. Finally, content-transporting tool 146 enables user 102 to transport the image (with the metadata embedded therein) to a destination that differs from the original location of the image or other piece of content. Tool 146 may enable user 102 to transport this image file in any number of ways, including via a drag-n-drop operation, a copy and paste operation, an insert file operation or in any other suitable manner.

As discussed above, this destination may be either local or remote to the computing device 104. For instance, user 102 may transport this image file to a directory folder that is local to computing device 104. Then, when user 102 selects the image file from this folder, computing device 104 may perform the action specified by the metadata (e.g., opening up a specified URL, causing display of an additional image, initiating acquisition of an item, etc.).

Conversely, user 102 may transport this image file into a window of a communication application for sending to another user. For instance, user 102 may transport the image file into a chat window, an email window or the like in order to send the image and the embedded metadata to the other user. Upon receiving the image file and/or upon opening the image file, the receiving computing device may then perform the action specified by the metadata. Again, these actions may include opening up a particular page associated with a specified URL, causing display of an additional image, initiating acquisition or an item or any other action that is external to the image in which the metadata is embedded.

Illustrative User Interfaces

Figure 2:
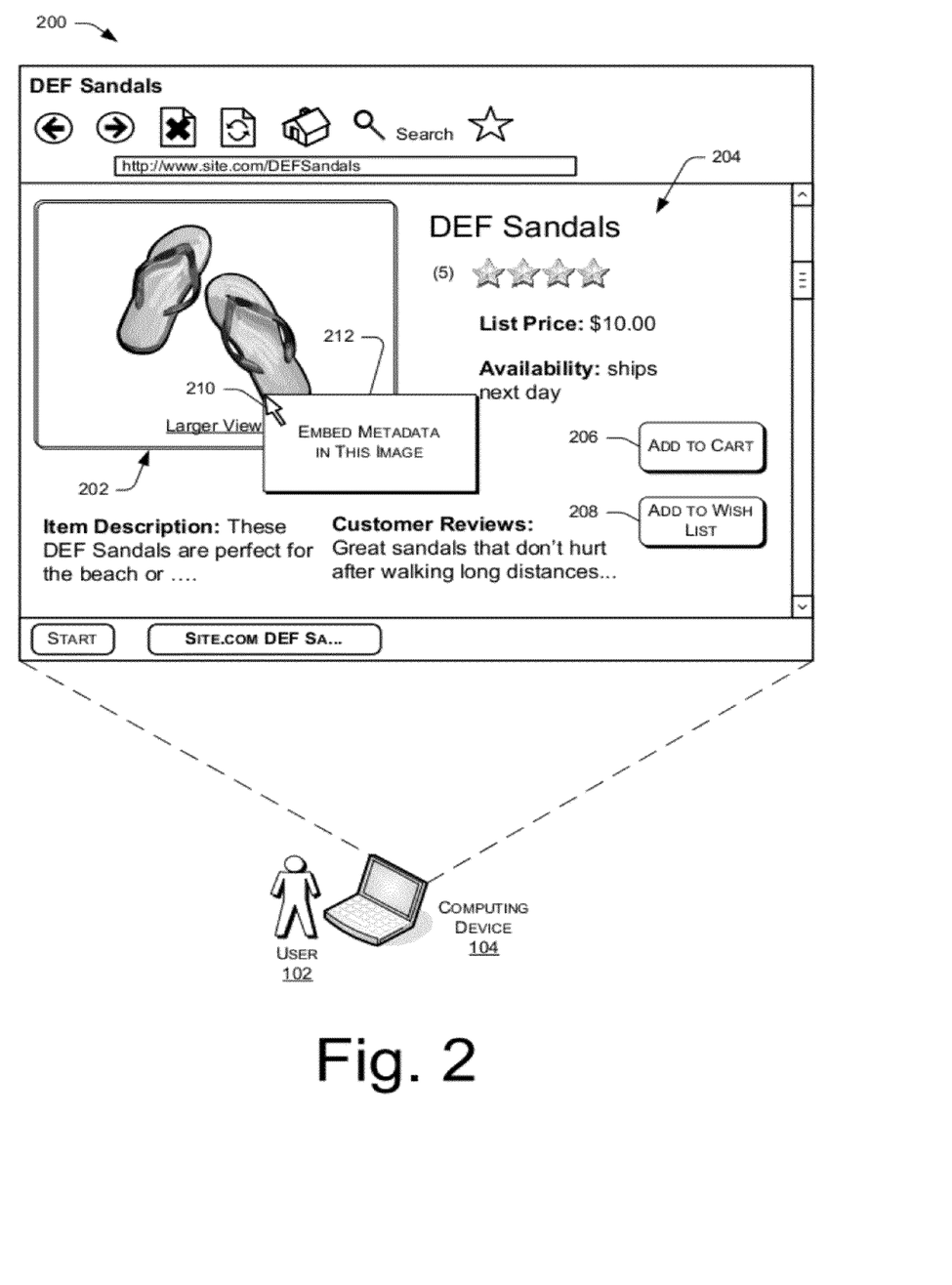
FIG. 2 illustrates an example user interface (UI) that the content provider of FIG. 1 may serve to the user of FIG. 1. This UI includes an image as well as additional content. With the described techniques, the user may choose to embed metadata within the image.

FIG. 2 illustrates an example user interface (UI) 200 that content provider 106 may serve to computing device 104 of user 102. With use of UI 200, user 102 may choose to embed metadata within a piece of content, such as an image.

As illustrated, UI 200 includes an image 202 of a pair of sandals that content provider 106 offers for consumption. While UI 200 includes an image, it is to be appreciated that the described techniques apply equally to videos, animations, songs or any other type of content that can be visually displayed in some manner. In addition to image 202, UI 200 includes details 204 associated with the items offered for consumption. These details include a name of the item, a price, an availability, a description, and a customer review, although details 204 are simply illustrative and other pages may include more, fewer and/or different details. Furthermore, it is noted that the applied techniques may apply to a wide variety of UIs in any sort of context.

User interface 200 also includes icons 206 and 208. When selected by user 102, icon 206 (entitled "Add to Cart") places the illustrated item into an electronic shopping cart of user 102. That is, selection of icon 206 initiates a first phase of acquiring the illustrated item. When user 102 selects icon 208 ("Add to Wish List"), meanwhile, content provider 106 adds the illustrated item to a personalized list of items that user 102 wishes to acquire. Again, it is noted that icons 206 and 208 are merely illustrative and that other embodiments may include more, fewer and/or different icons.

FIG. 2 further illustrates that user 102 may employ active-content module 134 to select an image to embed metadata therein. Here, user 102 chooses to embed metadata within image 202. In this embodiment, user 102 makes this selection via an input (e.g., a right click input or the like) from a cursor 210 operated by a cursor control device (e.g., mouse, keyboard, etc.). Of course, it is specifically noted that this selection means is merely illustrative and that user 102 may choose to embed metadata within image 202 in a multitude of other ways. In response to this selection, active-content module 134 presents an example menu 212 that offers user 102 the choice to embed metadata within image 202.

Figure 3:
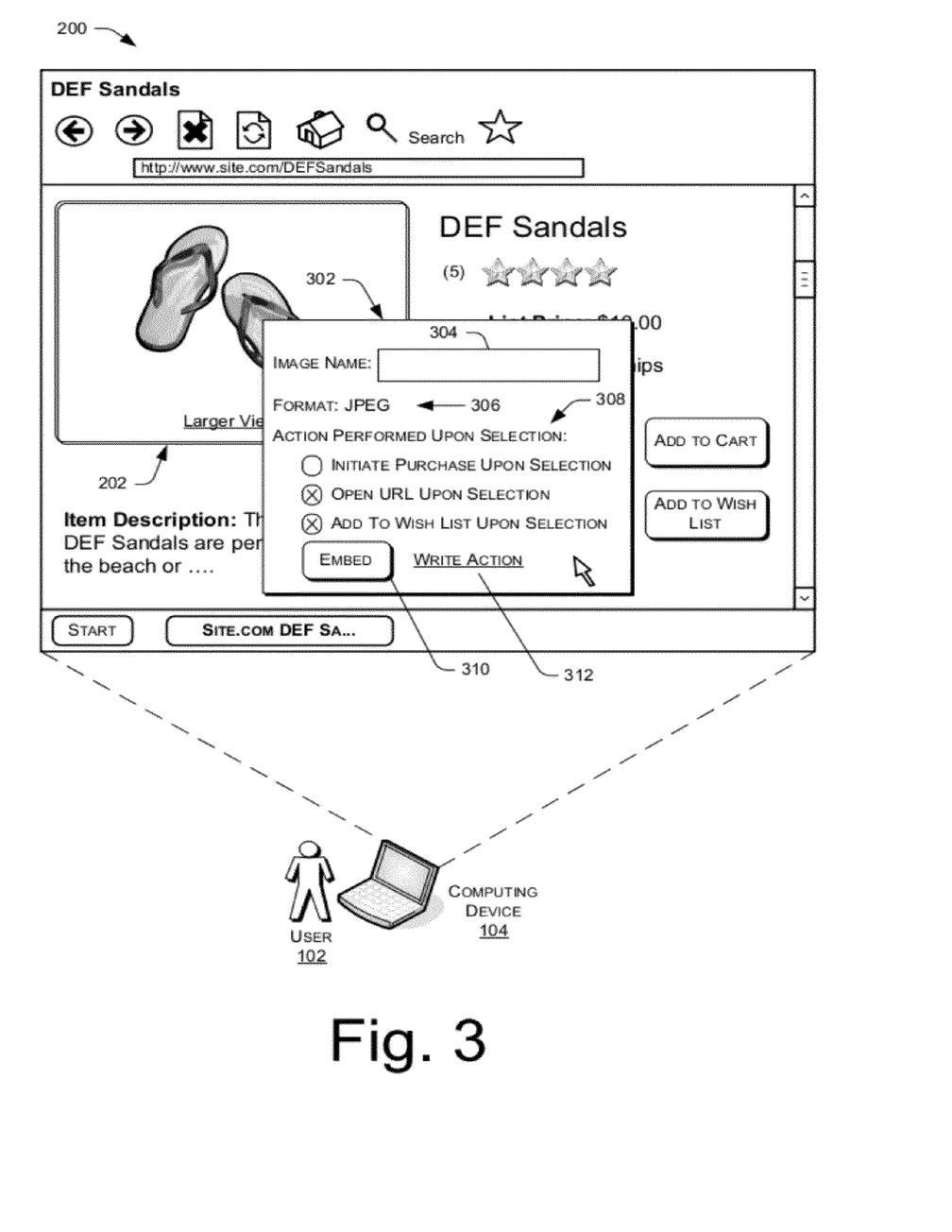
FIG. 3 illustrates the example UI of FIG. 2 after a user has selected to embed metadata within the illustrated image. As illustrated, this UI includes a menu that allows the user to specify an action to take upon selection of the image.

FIG. 3 illustrates UI 200 after user 102 has selected from menu 212 to embed metadata within image 202. Here, active-content module 134 has served and rendered a menu 302 that allows user 102 to determine one or more actions to be performed by a receiving application upon receiving, opening or otherwise selecting the image. As illustrated, menu 302 allow user 102 to provide a name 304 for the image file that includes image 202 and the embedded metadata.

Menu 302 also includes an indication of a format 306 of the file (which may or may not be selectable) as well as a list 308 of actions that that user may select from. Here, example list 308 allows the user to select from the following actions: initiate purchase upon selection, open a URL for the illustrated item upon selection or add to a wish list of the user upon selection. Menu 302 also includes an icon 310 (entitled "Embed") that, when selected, enables user 102 to embed the selected actions within the image file. Here, user 102 has selected the latter two example actions.

Therefore, if user 102 selects icon 310, active-content module 134 will embed this metadata and, hence, will create the image file including image 202 and the embedded metadata. Then, when user 102 opens or otherwise selects the image file, device 104 will extract the embedded metadata and will follow the instructions to: (i) cause display of a URL address associated with the item, and (ii) add the item to a wish list of user 102 at content provider 106. It is again noted, however, that these actions are simply illustrative and that other embodiments may embed metadata comprising any other sort of instructions that are external to image 202.

Figure 4:
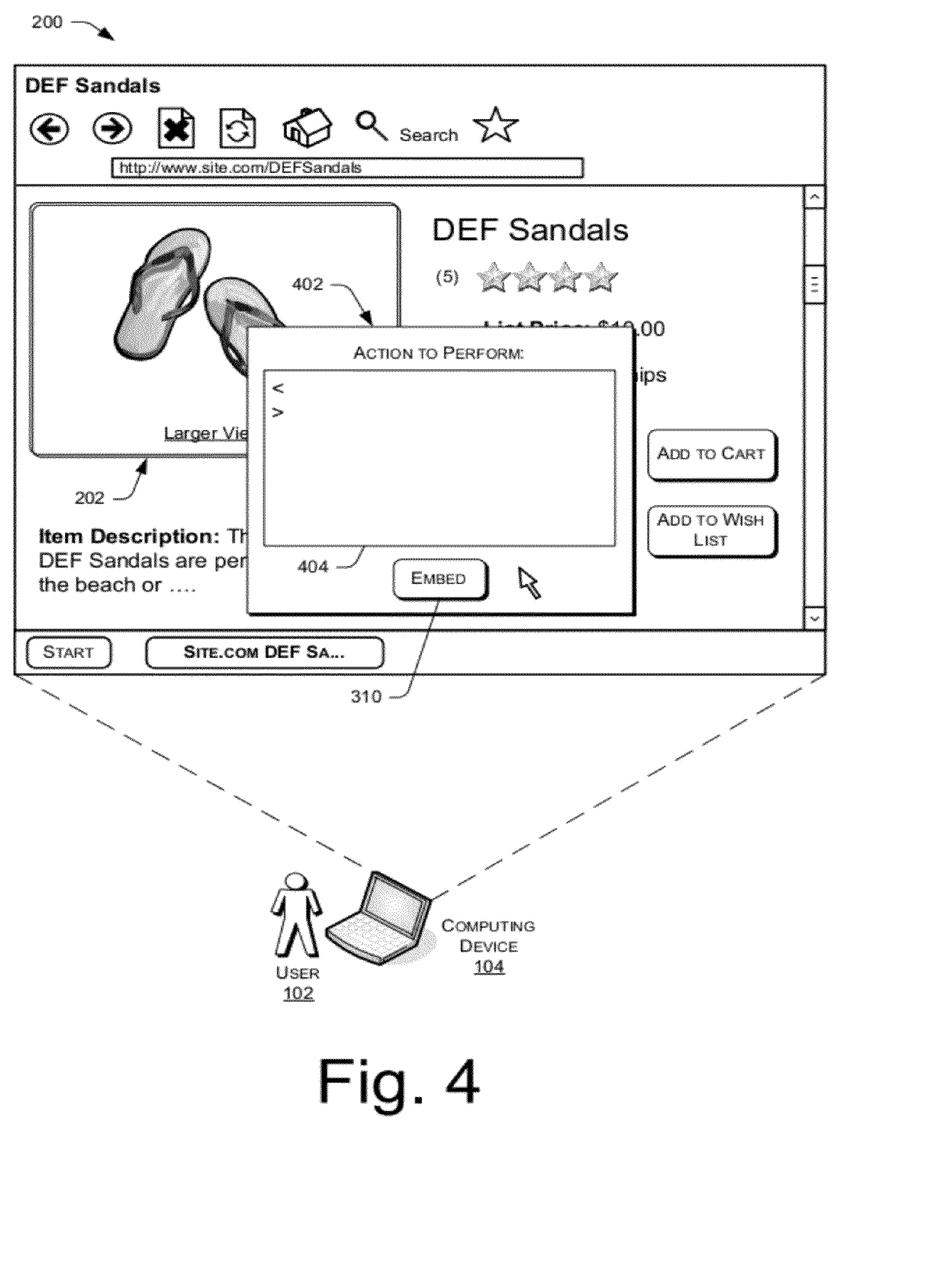
FIG. 4 illustrates the example UI of FIGS. 2 and 3 after the user has chosen to write his or her own action.

Finally, example menu 302 also includes a link 312 (entitled "Write Action") that allows user 102 to write his or her own instructions for embedding into image 202. FIG. 4 illustrates UI 200 after user 102 has selected link 312. Here, active-content module 134 has served and rendered a menu 402 that provides user 102 with a text box 404 in which user 102 may write his or her own custom action for embedding into image 202. Once user 102 completes the writing of this code, user 102 may choose to embed this code into image 202 by selecting icon 310.

Once user 102 has selected a piece of content (e.g., image 202) and has embedded metadata within the piece of content, user 102 may transport the created file to a location other than where the piece of content originated from. For instance, active-content module 134 (and, more specifically content-transporting tool 146) may allow user 102 to move image 202 and its embedded metadata from UI 200 and to another destination. This destination may be local (e.g., into a folder directory of device 104) or remote (e.g., to another user by transporting image 202 and the metadata into an email or other window provided by a communication application that specifies another user as a recipient). In either event, tool 146 may enable user 102 to perform this move with a drag-n-drop operation, a copy and paste operation, an insert file operation or via any other suitable operation. Additionally, in some instances user 102 may first transport the image and may then embed the metadata thereafter.

Figure 5:
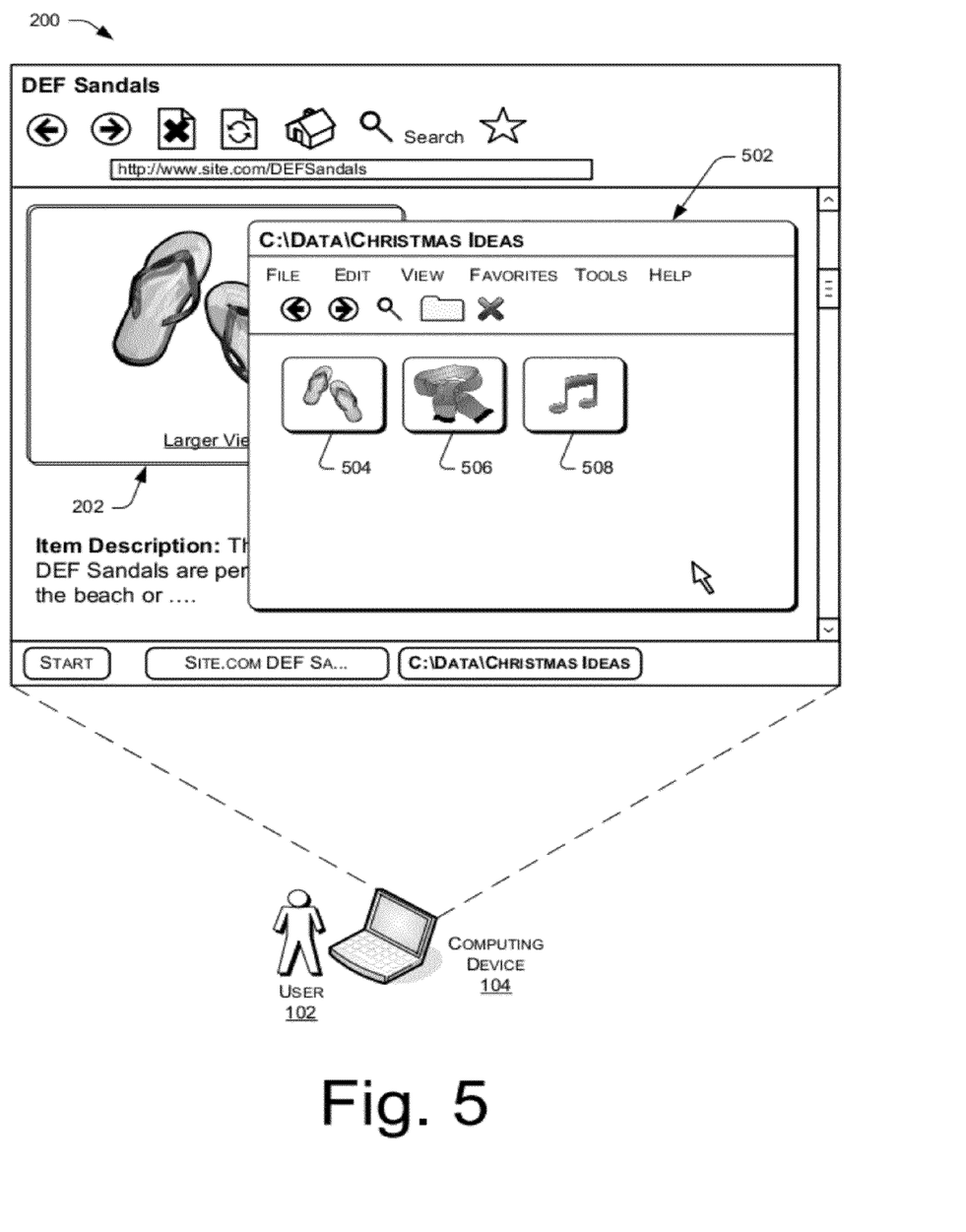
FIG. 5 illustrates that the user of FIGS. 1-4 has opened a directory folder that includes multiple image files (including the image file of FIGS. 2-4) that each comprise an image and metadata embedded therein. Upon selection of one or more of these image files, the embedded metadata of the image files instruct an application to take one or more actions.

FIG. 5 illustrates the display of device 104 after user 102 has opened up a local directory folder 502 of the user's device. That is, user 102 has opened up a folder with a path of "C:\Data\Christmas Ideas". As illustrated, folder 502 includes multiple image files 504, 506 and 508, each of which may comprise images and metadata embedded therein. Therefore, when user 102 opens or otherwise selects one of image files 504-508, device 104 may extract metadata from corresponding image and may perform the action that the metadata specifies.

For instance, FIG. 5 illustrates that user 102 has moved the image file 504 created by user 102 in FIGS. 2-4 into folder 504. Note that FIG. 5 denotes image file by the new reference character "504", as this file includes both image 202 as well as the metadata embedded therein by user 102. When user 102 opens or otherwise selects image file 504, computing device 104 may perform whatever action user 102 ultimately specified via menu 302 from FIG. 3 or menu 402 from FIG. 4. For instance, device 104 may instruct a web browser stored on device 104 to open up the URL associated with the illustrated pair of sandals, may instruct web browser to initiate acquisition of the sandals, or may cause performance of some other action or actions external to image 202.

Additionally, in some instances, user 102 may choose to collect multiple image files (e.g., image files 504-508) in a single location (e.g., folder 502) such that user 102 may perform the actions embedded therein simultaneously. Here, for instance, user 102 may have embedded metadata into each of image files 504-508 that instructs device 104 to initiate purchase of the illustrated items upon selection of the image files. Therefore, user 102 may use this "Christmas Ideas" folder 502 to maintain a list of those items that he or she plans to buy as Christmas presents. Once user 102 has finalized this list and the image files within folder 502, user 102 may simply select each of the image files (e.g., may open them up), thus causing initiation of the purchase of each of the illustrated items.

It is noted that while FIG. 5 illustrates a directory folder, user 102 may similarly move an image file to any destination that is local or remote to computing device 104. For instance, user 102 could move image file 504 to a desktop of device 104, to a window of an email, a window of a chat or instant messaging session or the like.

Additional Illustrative Architecture

Figure 6:
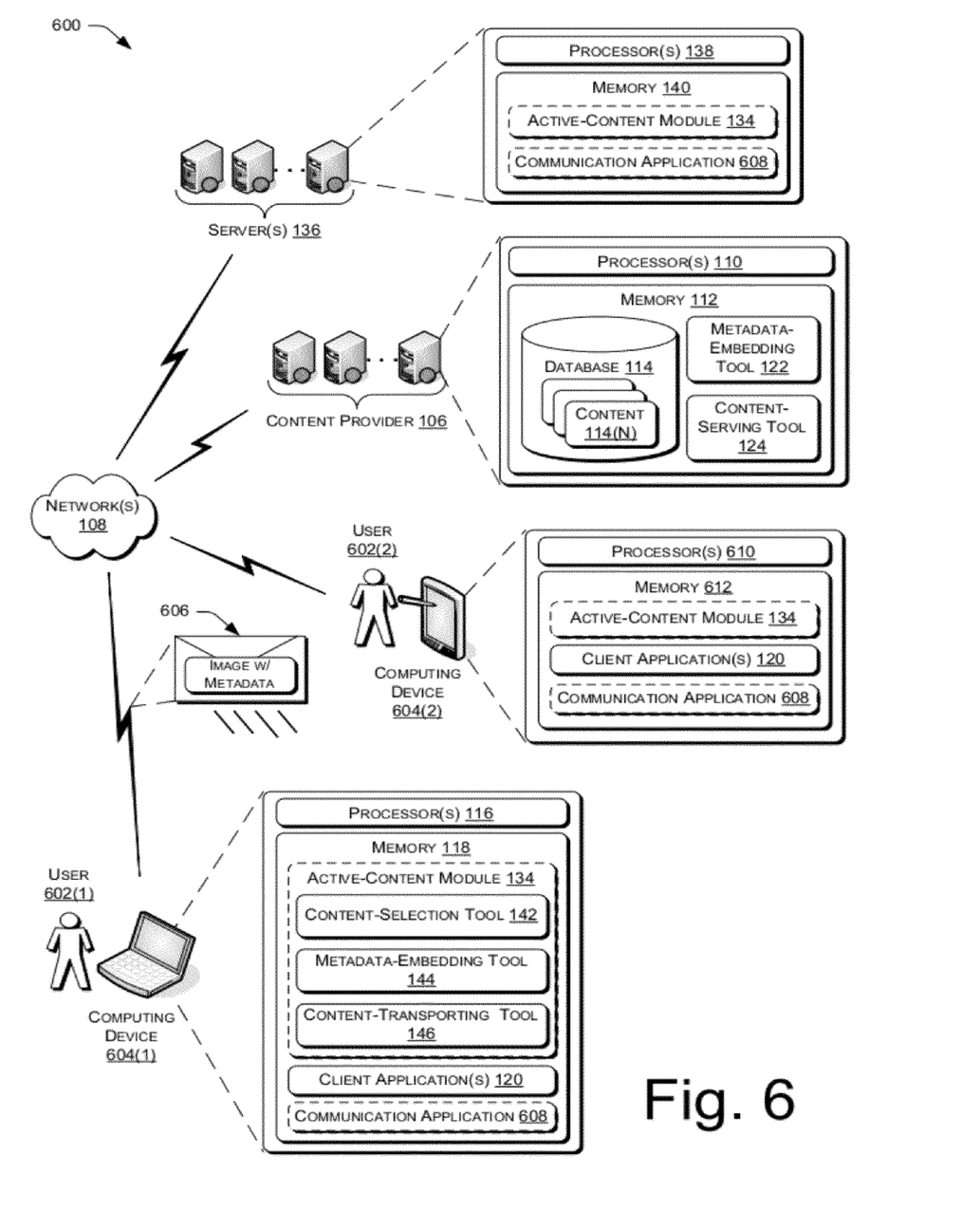
FIG. 6 illustrates another example architecture. Here, a first user sends an image file comprising an image with metadata embedded therein to a second user. Upon receiving and/or opening the image file, an application on a computing device of the second user performs one or more actions specified by the image file.

FIG. 6 illustrates another example architecture 600 that may implement the described techniques. Here, a first user 602(1) employs a computing device 604(1) to send an image file 606 comprising an image and metadata embedded therein to a second user 602(2). As discussed in detail below, upon receiving and/or opening image file 606, an application on computing device 604(2) performs one or more actions specified by the metadata within image file 606.

As illustrated, computing device 604(1) includes similar or the same functionality as computing device 104 described with reference to FIG. 1. For instance, computing device 104 includes active-content module 134 and one or more client applications 120. In addition, computing device 604(1) also stores or has access to a communication application 608. Communication application 608 may comprise an email client, a webmail application, an instant messaging application, a chat application, a text messaging application or any other application that allows user 602(1) to communicate with one or more users over network 108. As illustrated, computing device 604(1) may store communication application 608 locally or may access the communication application 608 stored on servers 136 over network 108.

Within architecture 600, user 602(1) may send a piece of content having metadata embedded therein with use of communication application 608. This metadata may have been embedded by content provider 106, by user 602(1) or by any other actor. To send this piece of content, user 602(1) may first use content-transporting tool 146 to transport, for instance, image file 606 into a window provided by the communication application. That is, user 602(1) may transport (e.g., drag-n-drop, copy and paste, etc.) image file 606 into an email window, an instant messaging window, a chat window or the like. The user may then send image file 606 to a recipient designated with the window provided by communication application 608. Here, user 602(1) sends image file 606 to user 602(2).

As illustrated, computing device 604(2) includes one or more processors 610 and memory 612. In some instances, computing device 604(2) performs the action specified by the metadata of image file 606 upon receiving the image file. For example, if image file 606 is sent by user 602(1) as an email or as a part of a chat session, computing device 604(2) may extract the metadata upon receiving the file and may perform the action(s) that the metadata specifies. In other instances, meanwhile, computing device 604(2) performs the action(s) in response to user 602(1) opening or otherwise selecting image file 606.

In some instances as described in detail below, user 602(1) may send an image file that includes an image of an item having an associated URL address. This URL address may point to a particular page associated with the item (e.g. a page similar to or the same as UI 200). Here, the metadata within the image file may specify this URL address and may specify that the receiving application on device 604(2) is to display content in addition to the image of the file. For instance, the image file may specify that device 604(2) should display the image of the image file as well as one or more details that can be found at the provided URL address. This additional content may comprise additional images, animations, videos, text, or the like.

Upon receipt of the image file in this example, computing device 604(2) may extract the URL address and may explore the content at this URL address to locate the additional images to display. Device 604(2) may then display this information within the received email or within the window of the instant messaging or chat session. These additional images may comprise, for instance, a price of the item illustrated in the image file, an availability of the item, a rating of the item or an indication of the URL address associated with the item.

In some instances, device 604(2) displays these additional images while the sending device 604(1) refrains from displaying the additional images. Furthermore, in addition or in the alternative to displaying one or more additional images, computing device 604(2) may perform any of the actions described above, depending upon the metadata embedded within the content. For instance, device 604(2) may open a particular URL, may add a person to a "friends" list of user 602(2), may open up an email window having a specified destination address or the like.

Additional Illustrative User Interfaces

Figure 7:
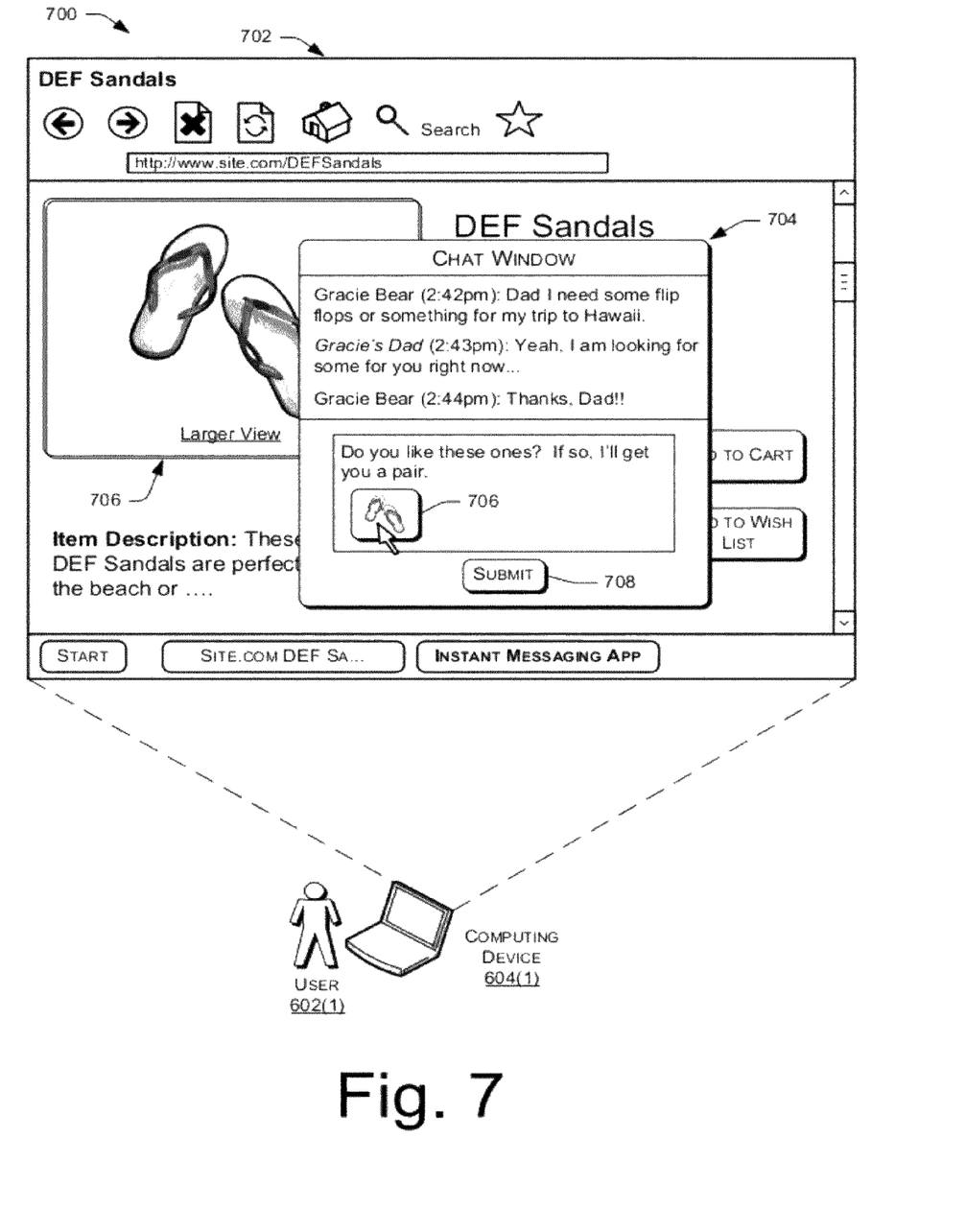
FIG. 7 illustrates an example UI that the first user of FIG. 6 may see before sending the image file comprising the image and the embedded metadata to the second User.

FIG. 7 illustrates an example user interface 700 displayed on computing device 604(1) of user 602(1) from FIG. 6. Here, user 602(1) has opened a page 702 associated with the pair of sandals discussed above with reference to FIGS. 2-5. In addition, user 602(1) has opened an instant messaging application 704 and is maintaining a real-time communication with user 602(2) within a window of the application.

As illustrated, page 702 may include an image file 706 that comprises both an image (here, of the sandals) as well as metadata embedded therein. This metadata may have been embedded by user 602(1), by content provider 106 or by any other actor. Without regard to how the metadata was embedded within the image, user 602(1) may transport image file 706 from page 702 and into application 704. For instance, user 602(1) may drag-n-drop image file 706 from page 702 and into a window maintaining the communication between users 602(1) and 602(2). After doings so, user 602(1) may select a "submit" icon 708 in order to send the communication (including image file 706) to user 602(2).

Figure 8:
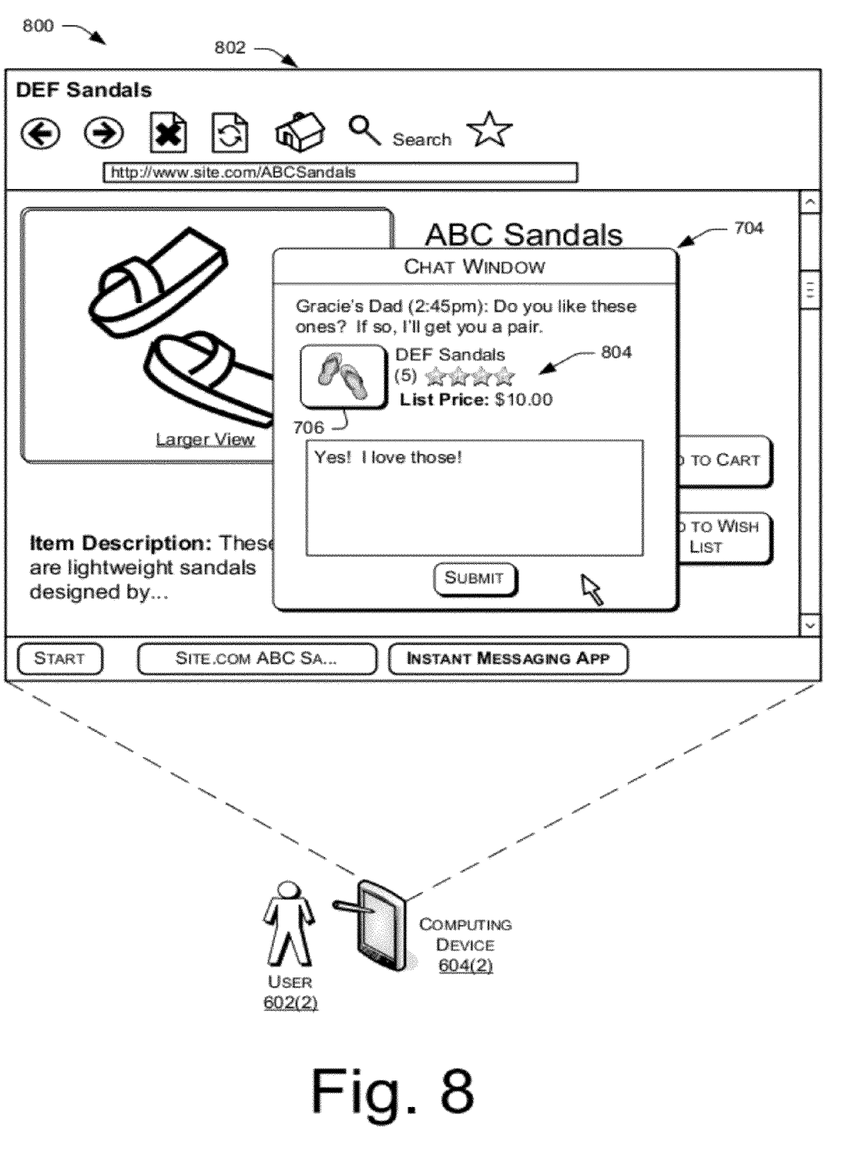
FIG. 8 illustrates an example UI that the second user of FIG. 6 may see after receiving the image file from the first user.

FIG. 8, meanwhile, illustrates an example user interface 800 displayed on computing device 604(2) of user 602(1). Example user interface 800 here displays that user 602(2) has opened up a different page 802 (here, associated with a different pair of sandals) as well as the instant messaging application 704 that user 602(1) is also using. The window of application 704 on device 604(2), however, displays that application 704 has received image file 706 sent by user 602(1). In addition to displaying the image of this image file, however, the illustrated window displays additional content 804. Here, additional content 804 comprises details about the illustrated pair of sandals, such as a name of the sandals, a rating of the sandals and a price of the sandals.

It is to be appreciated, however, that additional content 804 is merely illustrative and that application 704 could display any other sort of content. In addition or in the alternative, device 604(2) may perform any other action in response to receiving image file 706, as prescribed the metadata within the image file. For instance, device 604(2) may open up a page associated with the URL address of the item, may add the item to an electronic shopping cart of user 602(2) at content provider 106 or may perform any other similar or different action.

Illustrative Processes

Figure 9:
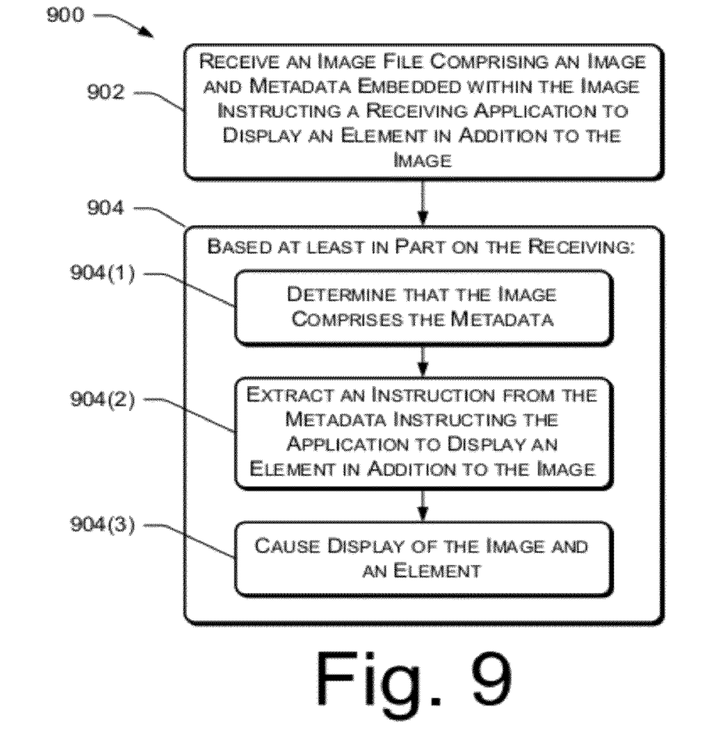
FIGS. 9-12 are flow diagrams of embodiments of processes for embedding metadata within a piece of content effective to instruct a receiving application to perform an action responsive to receiving and/or opening the piece of content.

FIG. 9 illustrates an example process 900 for embedding metadata into a piece of content, such as an image or a video. Process 900 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 900 includes an operation 902, which represents receiving an image file comprising an image and metadata embedded within the image. In some instances, the image file is received from a first user and within a window of a real-time communication application maintaining a real-time communication between the first user and a second user. In addition, the image file may originate from a page of content that is independent from the real-time communication application.

Next, process 900 includes an operation 904 that occurs based at least in part on the receiving of the image file. As illustrated, operation 904 comprises a series of sub-operations. At sub-operation 904(1), the real-time communication application determines that the image comprises the metadata. Next, at sub-operation 904(2), the real-time communication application extracts the metadata embedded within the image from the image, the metadata instructing the real-time communication application to display an element within a window of the real-time communication application of the second user. Finally, at sub-operation 904(3), the application causes display of the image and the element in the window of the real-time communication application of the second user.

Figure 10:
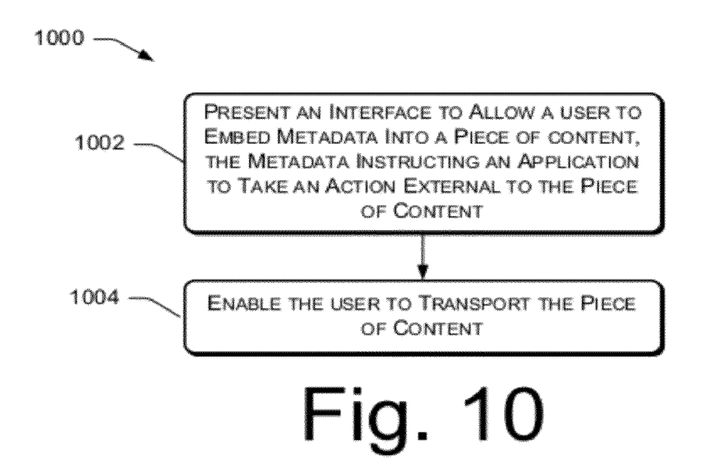

FIG. 10 illustrates a process 1000, which includes enabling a user to embed metadata into a piece of content at an operation 1002. For instance, the user may embed metadata into an image in the manner shown in FIGS. 2-4. Next, an operation 1004 enables the user to transport the piece of content to a local or a remote destination. For instance, the user may send the piece of content to another user via a communication application or the user may move the piece of content to a location on the device of the user.

Figure 11:
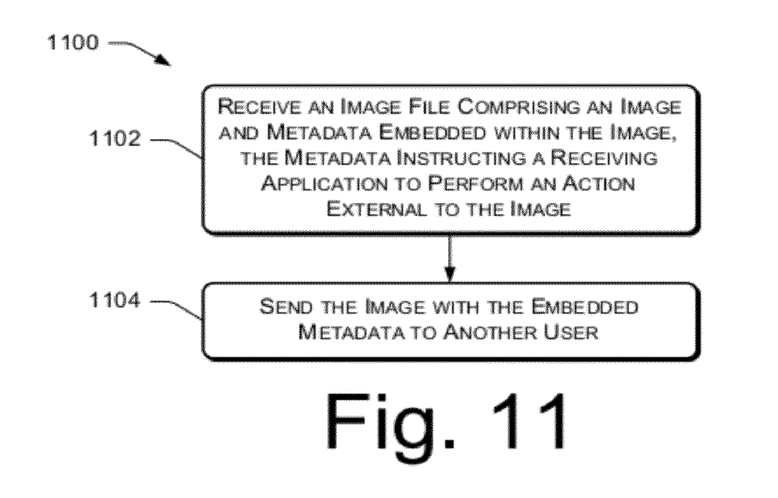

FIG. 11, meanwhile, illustrates a process 1100. Process 1100 includes receiving, from a user, an image file that comprises an image and metadata embedded within the image at an operation 1102. Next, an operation 1104 sends the image with the embedded metadata to another user. For instance, the image file may be sent via an email, an instant message, a text message or in any other suitable manner.

Figure 12:
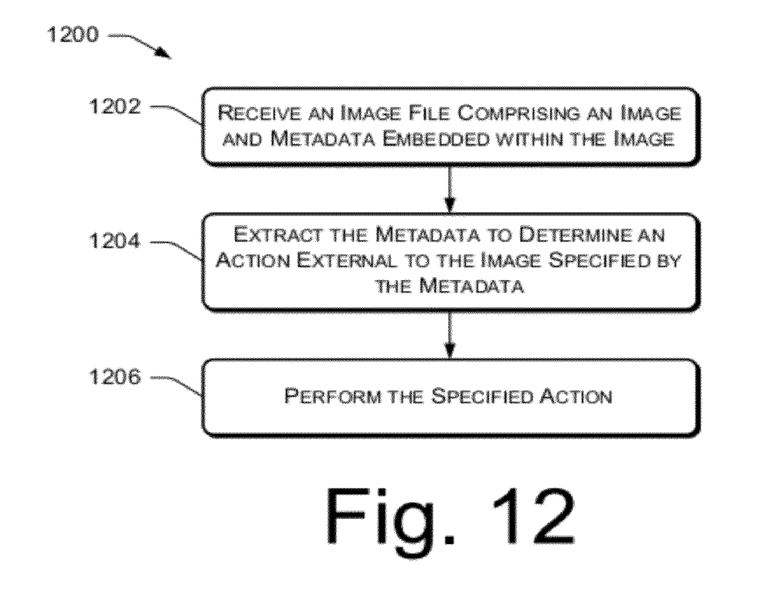

Finally, FIG. 12 illustrates a process 1200, which again includes receiving, from a user, an image file that comprises an image and metadata embedded within the image at an operation 1202. Next, an operation 1204 extracts the metadata to determine an action specified by the metadata. Finally, an operation 1206 performs the action specified by the metadata.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed on one or more processors, perform acts comprising:
   receiving, from a first user and within a window of a real-time communication application maintaining a real-time communication between the first user and a second user, an image file that is independent from the real-time communication application, the image file comprising:
      an image of an item that is available for acquisition at a merchant website,
      metadata comprising one or more instructions that are executable to perform an action that is external to the image file, and
      data visually indicating the action to be performed when the one or more instructions are executed by the real-time communication application;
   at least partly in response to receiving the image file, extracting the metadata from the image file; and
   executing the one or more instructions by the real-time communication application to display the image and an element in the window of the real-time communication application of the second user, the element comprising at least one of a price of the item, an availability of the item, a uniform resource locator (URL) for a page associated with the item, or a rating of the item.

2. One or more computer-readable media as recited in claim 1, wherein the action further comprises selecting the item for acquisition by the second user, acquiring the item for the second user, displaying an additional image in addition to displaying the image, or selecting a link to an executable file or an application.

3. One or more computer-readable media as recited in claim 1, wherein the image file is received by the real-time communication application in response to the first user dragging and dropping the image file into the window of the real-time communication application.

4. One or more computer-readable media as recited in claim 1, wherein the data comprises an icon.

5. One or more computer-readable media as recited in claim 1, wherein the real-time communication application comprises a text messaging application, an instant messaging application or a chat application.

6. A method comprising:
   receiving, from a first user and by a communication application, an image file from a page of content that is independent from the communication application, the image file comprising:
      an image of an item that is available for acquisition at a merchant website,
      metadata including instructions executable by a receiving application of a computing device of a second user to perform an action that is external to the image file, the action being performed in addition to displaying the image, and
      data to visually indicate that the image file includes the instructions to perform the action; and
   sending the image file from the communication application to the computing device of the second user that is specified by the first user, the instructions of the metadata executable by the receiving application of the computing device of the second user to perform the action, the action comprising displaying at least one of a price of the item, an availability of the item, a uniform resource locator (URL) for a page associated with the item, or a rating of the item.

7. A method as recited in claim 6, wherein the data comprises data for displaying an icon.

8. A method as recited in claim 7, wherein the action further comprises selecting the item for acquisition by the second user, acquiring the item for the second user, displaying an additional image in addition to displaying the image, or selecting a link to an executable file or an application.

9. A method as recited in claim 6, wherein the image file is received by the communication application at least in part in response to the first user dragging and dropping the image file or the image from the page of content into a window of the communication application, the window specifying the second user as a recipient of the image file.

10. A method as recited in claim 6, wherein the communication application comprises an email client, a webmail application, an instant messaging application, a chat application or a text messaging application.

11. A method as recited in claim 6, wherein:
   the communication application comprises an instant messaging application or a chat application;
   the image file is received by the instant messaging application or the chat application at least in part in response to the first user dragging and dropping the image file or the image from the page of content and into a window of the application, the window maintaining a real-time communication between the first user and the second user; and
   the action taken comprises displaying, by the computing device of the second user, an additional image in addition to the image.

12. A method as recited in claim 11, wherein the additional image is associated with an additional item that is available for acquisition at the merchant website.

13. One or more non-transitory computer-readable media storing computer-executable instructions that, when executed on one or more processors, perform acts comprising:
   receiving an image file from a first computing device associated with a first user, the image file being received by a real-time communication application of a second computing device associated with a second user, the image file comprising:
      an image of an item that is available for acquisition at a merchant website, metadata including instructions that are executable by the application to perform an action that is external to the image file and is in addition to displaying the image, and data to visually indicate that the image file includes the instructions to perform the action;

extracting, by the real-time communication application, the instructions from the metadata; and executing the instructions, by the real-time communication application, to perform the action at least partly in response to receiving the image file, the action comprising displaying at least one of a price of the item, an availability of the item, a uniform resource locator (URL) for a page associated with the item, or a rating of the item.

14. One or more computer-readable media as recited in claim 13, wherein the data comprises data for displaying an icon.

15. One or more computer-readable media as recited in claim 13, wherein the real-time communication application comprises an instant messaging application, a chat application or a text messaging application.

16. One or more computer-readable media as recited in claim 13, wherein the action comprises displaying the the price of the item, the availability of the item, the uniform resource locator (URL) for a page associated with the item, or the rating of the item adjacent to the item.

* * * * *